Figure 1:
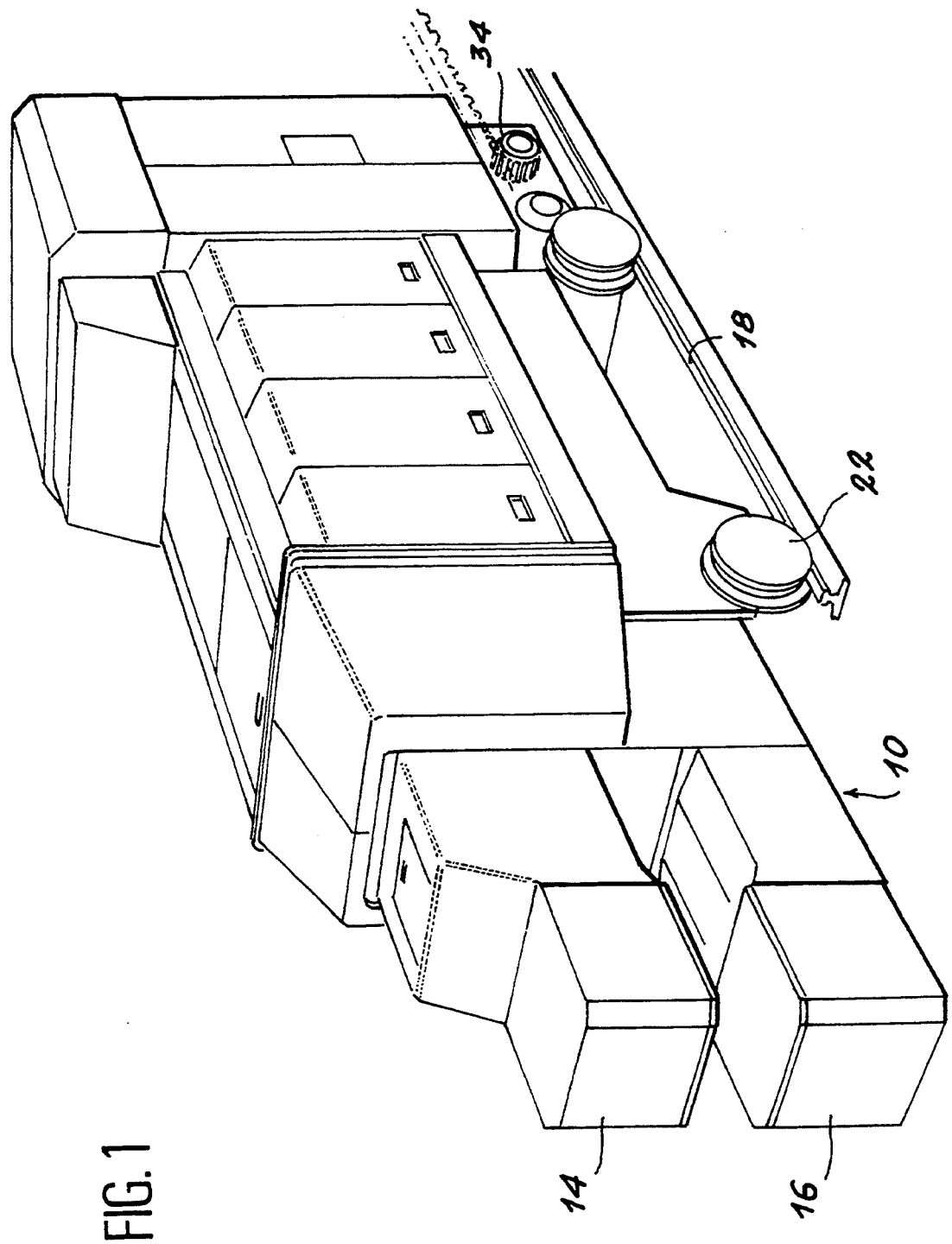

United States Patent [19]

Couffet et al.

[11] Patent Number: 5,370,172

[45] Date of Patent: Dec. 6, 1994

[54] SAFETY DEVICE FOR MOBILE MODULES WHICH INDUCTIVELY HEAT OR REHEAT METALLURGICAL PRODUCTS

[75] Inventors: Claude Couffet, Montreuil; Jean Hellegouarc'h, Le Perreux/Marne; Gérard Prost, Fresnes; Jean C. Uring, Colmar, all of France

[73] Assignee: Celes, Lautenbach, France

[21] Appl. No.: 80,832

[22] Filed: Jun. 24, 1993

[30] Foreign Application Priority Data

Jun. 24, 1992 [FR] France ................. 92 07740

[51] Int. Cl.$^5$ ............ B22D 11/16; B22D 45/00
[52] U.S. Cl. ............................. 164/417; 164/154.5; 219/646; 219/654; 219/650
[58] Field of Search ............... 164/451, 150, 477, 454, 164/154, 417, 151.3, 154.2, 154.5; 72/342.1; 219/645, 646, 653, 654, 650; 185/4, 6, 7, 27, 32, 33; 105/72

[56] References Cited

U.S. PATENT DOCUMENTS

| | | | |
|---|---|---|---|
| 659,660 | 10/1900 | Gehre | 185/33 |
| 995,037 | 6/1911 | Smyth | 185/4 |
| 3,313,907 | 4/1967 | Geisel et al. | 219/650 |
| 3,705,967 | 12/1972 | Bobart et al. | |
| 4,810,843 | 3/1989 | Wicker et al. | 219/645 |
| 5,024,164 | 6/1991 | Leist | 105/127 |
| 5,034,586 | 7/1991 | Havas et al. | 216/645 |
| 5,126,522 | 6/1992 | Katayama et al. | 219/645 |
| 5,179,258 | 1/1993 | Arvedi et al. | 219/645 |

FOREIGN PATENT DOCUMENTS

| | | | |
|---|---|---|---|
| 183209 | 6/1986 | European Pat. Off. | |
| 0568637 | 3/1924 | France | 105/72 |
| 53-11332 | 2/1978 | Japan | 219/645 |

OTHER PUBLICATIONS

Kase, et al., "Pratique du laminage direct sur train a bandes a chaud de brames coulées en continu," *Cahiers D'Informations Techniques de la Revue de Metallurgie*, vol. 82, No. 4, Apr. 1985, pp. 339-348.

Patent Abstracts of Japan, vol. 3, No. 14, JP-A-5314113, Aug. 1978 (Abstract only).

*Primary Examiner*—P. Austin Bradley
*Assistant Examiner*—Erik R. Puknys
*Attorney, Agent, or Firm*—Pollock, Vande Sande & Priddy

[57] ABSTRACT

Mobile modules for electromagnetic-induction heating or reheating a flat metallurgical product on the move, wherein each of the said modules is mounted so as to move on a track perpendicular to the direction of movement of the product. Each module includes an on-board counterweight, the potential energy of which may, at any instant, be used to quickly remove the module from the product.

5 Claims, 3 Drawing Sheets

SAFETY DEVICE FOR MOBILE MODULES WHICH INDUCTIVELY HEAT OR REHEAT METALLURGICAL PRODUCTS

The present invention relates to systems for induction heating of metal products on the move, such as blooms or strip products.

It is known that these induction heating systems are commonly used in installations for treating metallurgical products (metal strips, blooms, slabs, etc.) coming from casting installations, especially continuous-casting installations, and having to be conveyed to rolling systems. The invention applies especially to the heating of flat metallurgical products on the move which have to be reheated before they pass between the rolls of a rolling system. In installations used for these treatments, the induction heating is produced with the aid of reheating modules between the inductors of which the product continuously moves.

Currently known edge-reheating modules are therefore provided either with independent upper and lower inductors or with upper and lower inductors which are articulated about a common axis. These systems therefore make it possible to accept a dimensional defect in the treated product by increasing the magnitude of the air gap, that is to say the vertical difference separating the upper and lower inductors. These known systems are therefore provided with defect detectors coupled to a means for rapidly opening the inductors. However, in the event of power cuts in the mains supplying the inductors, it may happen that a product, especially a bloom, becomes held beneath the inductors. In this event, the safety of the equipment cannot be ensured completely in the absence of means for retracting the modules.

The invention proposes providing a device making it possible to make sure that the inductive heating modules in installations of the type mentioned hereinabove are intrinsically safe.

Consequently, the invention relates to a safety device for modules for electromagnetic-induction heating or reheating of a flat metallurgical product on the move, characterized in that each of the said modules is mounted so as to move on a track perpendicular to the direction of movement of the product and in that it includes an on-board counterweight, the potential energy of which may, at any instant, be used immediately to act on a means making sure that the said module is rapidly moved on its track, thus liberating it from the product.

According to a preferred embodiment of the device according to the invention, the counterweight on-board each module is mounted so as to slide on one or more chains or the like, to which it may be solidly connected via a stop fixed to the said chain on which it bears in order to pass from a high position to a low position during a rapid retraction of the said module, the said chain or chains being in engagement with a pinion meshing on a rack fixed to the ground parallel to the track so that the rotation of the said pinion, resulting from the counterweight coming down, causes the module to move along the said rack on its rolling track.

According to a variant of the present invention, the chain drives one of the wheels of the module directly, the latter thus being moved along its track when the counterweight comes down.

According to another characteristic of the present invention, the device includes an electric motor on board each module, which can drive the said pinion, or the said wheel, via a clutch, in order to make sure that the counterweight returns to the high position, in the working position, from the parked position in which the counterweight is in the low position.

Figure 2:
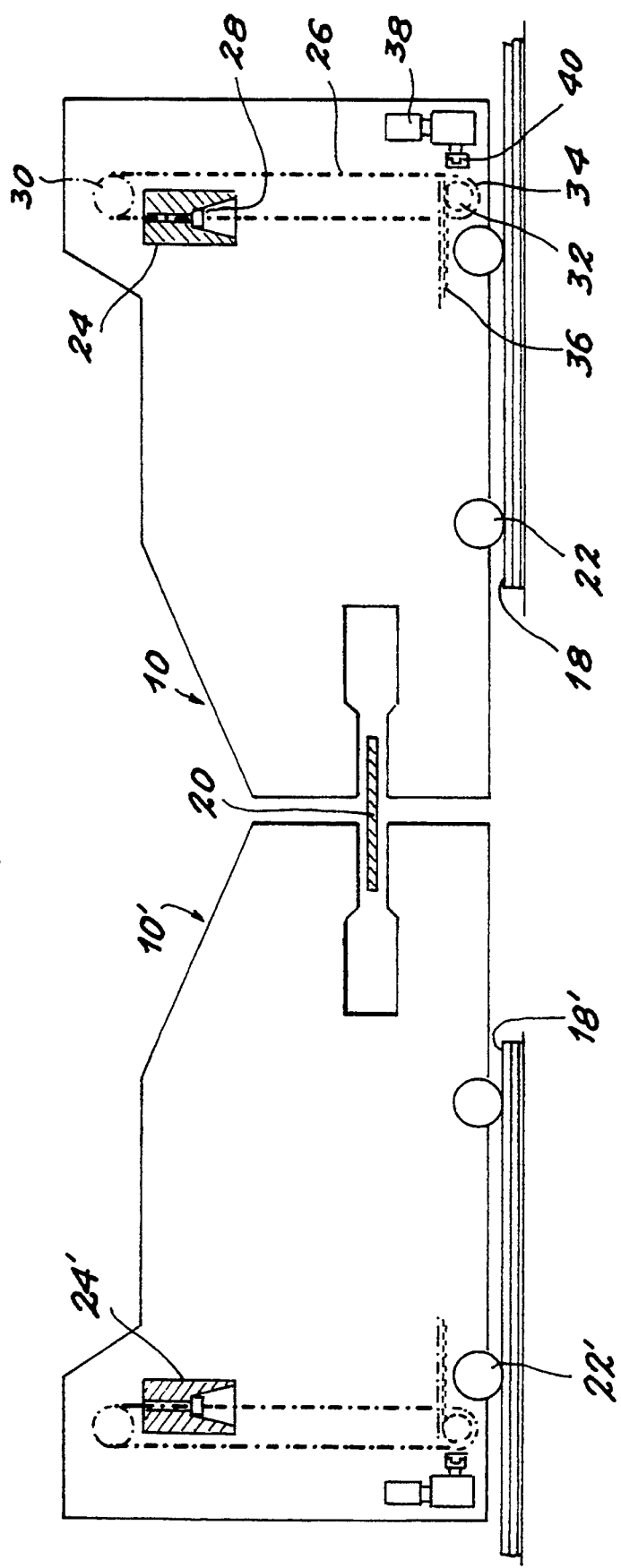
Figure 3:
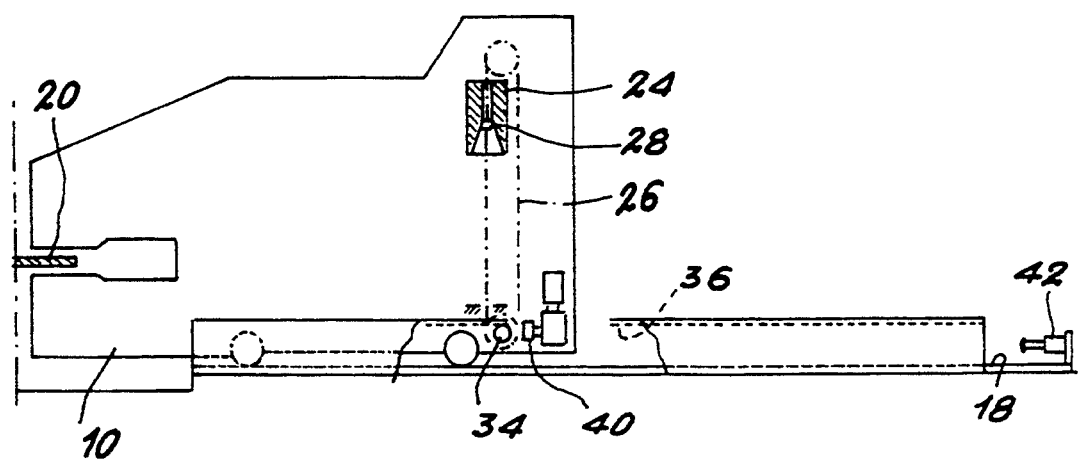
Figure 4:
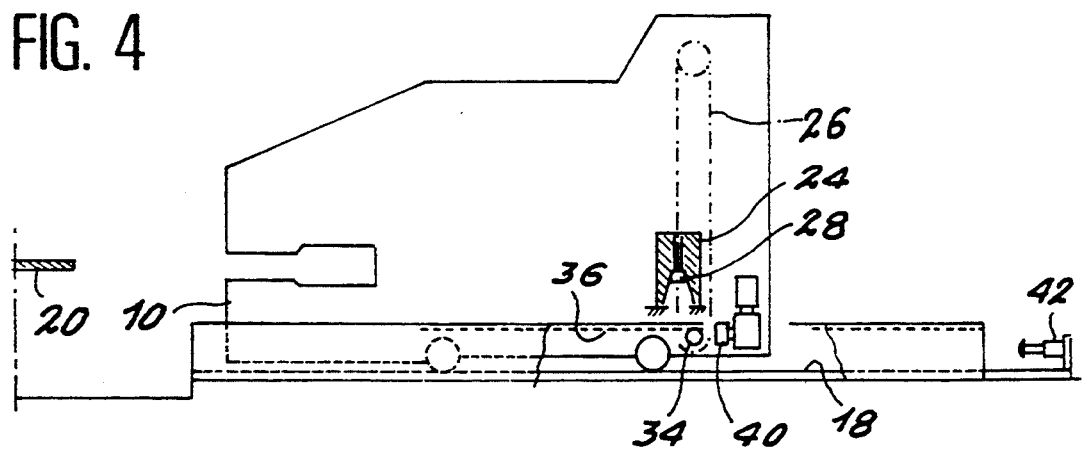
Figure 5:
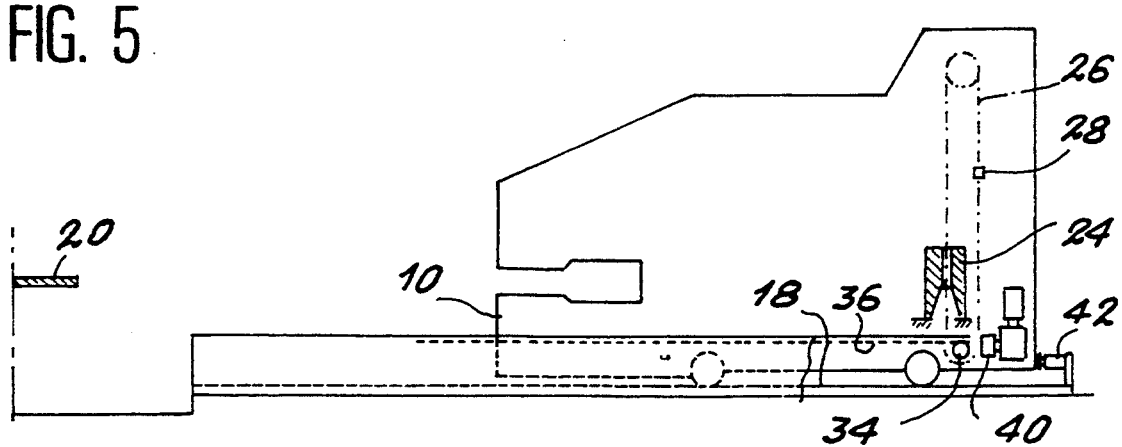

Other characteristics and advantages of the present invention will emerge from the description given hereinbelow with reference to the attached drawings which illustrate an embodiment thereof which is devoid of any limiting character. In the drawings:

FIG. 1 is a perspective view of one of the induction heating modules which has been improved according to the present invention;

FIG. 2 is a diagrammatic front-elevation view showing the arrangement of the two modules provided for the heating of the edges of a flat metallurgical product, the two modules being shown in the working position, and FIGS. 3, 4 and 5 are diagrammatic front-elevation views showing one of the modules illustrated by FIGS. 1 and 2, respectively in the working position, in the returned position and in the parked position.

Referring to the drawing, especially to FIGS. 1 and 2, it may be seen that, as is known, the installation includes two identical modules, respectively 10, 10', each being fitted with upper 14 and lower 16 inductors (see FIG. 1) between which the product 20 to be heated or reheated, here consisting of a bloom 20, passes. These inductors are of a type well known to the person skilled in the art; they do not form part of the invention, and consequently there seems no point in describing them in detail.

Each heating or reheating module, such as 10 or 10', is mounted so as to move on a track, respectively 18, 18', perpendicular to the direction of movement of the product 20 between the inductors, each module including, for this purpose, wheels such as 22, 22'. It furthermore includes a counterweight, respectively 24, 24', on board the relevant module, the potential energy of which may, at any instant, be released immediately in order to act on a means which, according to the invention, makes sure that each module is rapidly moved on its track 18 or 18' so as to liberate the product 20 from the air gap of the inductors.

In the non-limiting embodiment illustrated in FIGS. 2 to 4, each counterweight, such as 24, is mounted so as to slide on a chain 26 or the like, to which it may be solidly connected by virtue of the presence of a stop 28 fixed to the chain and on which it bears, as may be seen clearly in the drawing. This chain is tensioned between two chain wheels 30, 32, the lower wheel 32 being solidly connected to a pinion 34, journal-mounted the frame of the module, engaging on a rack 36 fixed to the ground and parallel to the track, such as 18, of the relevant module.

Of course, it is possible, without departing from the scope of the invention, to use any means equivalent to the chain 26, for example, one or more cables or one or more endless belts stretched between two pulleys similar to the chain wheels 30 or 32, the lower pulley then being attached (like the wheel 32) to the pinion 34 engaged with the rack. Each module furthermore includes an electric motor, such as 38, driving the pinion 34 via a clutch 40 to return the module to its operative position.

According to a variant of the present invention, the chain or chains drive one of the wheels, such as 22, of the module directly, the latter thus being moved along its track 18 when the counterweight comes down. In this variant, the electric motor, such as 38, drives the wheel to return the module to its operative position. The operation of the intrinsic safety device according to the present invention is as follows:

1. Working position (FIG. 3)

In this position, the heating or reheating module, here the module 10, is arranged so that the bloom 20 to be treated is located in the air gap separating the inductors. The counterweight 24 is in the high position, held on its stop 28 and the clutch 40, in the engaged position, prevents any rotation of the pinion 34 along the rack 36.

2. Return position (FIG. 4)

In the event of a malfunction, observed in the overall reheating of the edges of the bloom 20 resulting, for example, from a dimensional defect of this bloom 20, which is not capable of being accepted by the air gap of the inductors of a module, such as 10 or 10', the clutch 40 immediately passes into the disengaged position, which immediately releases the potential energy of the counterweight 24 which passes from the high position, illustrated by FIG. 3, to the low position, shown in FIG. 4. During this movement of the counterweight, the chain 26 rotates the pinion 34 which then moves along the rack 36 thus rapidly moving the module towards the right of the drawing, that is to say into a position where the product 20 is liberated from the influence of the inductors of the relevant module. The safety of the equipment is thus guaranteed. According to the invention, a limit stop 42 or the like is provided so as to control the length of travel of the return movement of each heating or reheating module such as 10 or 10'.

3. Parked position (FIG. 5)

In this position, the counterweight 24 is at rest at the lower part of its travel. The chain rotates counterclockwise, and stop 28, travelling with the chain 26, becomes free of the indicated stop recess in the counterweight as a result of the inertia of the system. This occurs when the clutch 40 is disengaged. From this position, the module may be brought back into the position illustrated by FIG. 3 by actuating the motor 38 which drives the pinion 34 along the rack 36, the clutch 40 being in the engaged position. The chain is driven in a clockwise direction causing the stop 28 to again engage the recess in the counterweight. During this movement, the safety system is reset, given that the counterweight 24 bearing on its stop 28 is brought back by the movement of the chain 26 into the working position illustrated by this FIG. 3.

Among the advantages provided by the system which forms the subject of the invention, such as described hereinabove, mention will be made especially of the following:

increase in the unitary power of the heating or reheating modules by elimination of magnetic coupling (magnetic-attraction effects of the yokes of the inductors);

simplification of the mechanisms managing the overall movements of the modules;

elimination of vibration of the yokes and of the forces resulting on the pivots;

elimination of any auxiliary power source for setting the safety device, and obtaining complete thermal safety of the equipment in the event of a lack of cooling resulting, for example, from a power cut in the mains supplying the inductors of the modules.

It remains understood that the present invention is not limited to the embodiment described and/or shown, but that it encompasses all variants thereof.

We claim:

1. An induction heating mobile module comprising:
    a plurality of locomotion wheels mounted on a track;
    a front end slot for engaging therein a metal object undergoing heating, the object moving through the slot in a direction perpendicular to the track; and
    a safety device located in the mobile module for withdrawing the mobile module from the object, the safety device including
    (a) a first chain wheel;
    (b) a chain entrained around the wheel;
    (c) a counterweight mounted to the chain, in a normally raised position;
    (d) a second chain wheel entrained by the chain;
    (e) clutch means for normally locking the second chain wheel in place;
    (f) release of the clutch means allowing descent of the counterweight and causing coupled chain and second chain wheel movement in a first rotational direction;
    (g) means driven by the second chain wheel for displacing the mobile module out of engagement with the metal object upon release of the clutch means.

2. An induction heating mobile module as described in claim 1 wherein the means driven by the second chain wheel further comprises:
    a pinion gear mounted to the second chain wheel; and
    a fixed rack gear, meshing with the second chain wheel, and positioned parallel to the track.

3. An induction heating mobile module as described in claim 1 wherein the means driven by the second chain wheel is a module locomotion wheel.

4. An induction heating mobile module as described in claim 2 further comprising:
    motor means connected to the clutch means for selectively reversing the rotation of the second chain wheel thereby displacing the mobile module to its original object engaging position, while simultaneously rewinding the chain mounted counterweight to an initial raised position.

5. An induction heating mobile module as described in claim 3 further comprising:
    motor means connected to the clutch means for selectively reversing the rotation of the second chain wheel thereby displacing the mobile module to its original object engaging position while simultaneously rewinding the chain mounted counterweight to an initial raised position.

* * * * *